US009888449B2

(12) United States Patent
Khude et al.

(10) Patent No.: US 9,888,449 B2
(45) Date of Patent: Feb. 6, 2018

(54) METHOD AND APPARATUS FOR TIMING SOURCE SELECTION AND DESELECTION DISTRIBUTED DEVICE TO DEVICE SYNCHRONIZATION

(71) Applicant: QUALCOMM Incorporated, San Diego, CA (US)

(72) Inventors: Nilesh Nilkanth Khude, Bridgewater, NJ (US); Sebastien Henri, Paris (FR); Vincent Douglas Park, Budd Lake, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 14/158,701

(22) Filed: Jan. 17, 2014

(65) Prior Publication Data
US 2015/0208367 A1   Jul. 23, 2015

(51) Int. Cl.
*H04W 4/00* (2009.01)
*H04W 24/00* (2009.01)
(Continued)

(52) U.S. Cl.
CPC ......... *H04W 56/001* (2013.01); *H04W 4/023* (2013.01); *H04W 4/06* (2013.01);
(Continued)

(58) Field of Classification Search
CPC  H04W 56/001; H04W 56/0015; H04W 88/06
See application file for complete search history.

(56) References Cited

U.S. PATENT DOCUMENTS 7,340,266 B2    3/2008  Robinson
7,675,869 B1 *  3/2010  Anker .................... H04L 12/42
                                                    370/255
(Continued)

OTHER PUBLICATIONS

International Search Report and Written Opinion—PCT/US2015/011771—ISA/EPO—dated Jul. 15, 2015.
(Continued)

*Primary Examiner* — Charles C Jiang
*Assistant Examiner* — Ryan Kavleski
(74) *Attorney, Agent, or Firm* — Arent Fox LLP

(57) ABSTRACT

A method, an apparatus, and a computer program product for wireless communication are provided in connection with enabling timing source selection and deselection in a decentralized manner for distributed D2D synchronization in densely populated communications systems. In an example, a communications device, functioning in a non-timing source (TS) mode, is equipped to receive a request for timing information during a synchronization channel. The communications device may further be equipped to determine whether to switch to a TS mode based on a selection utility metric value. In another example, a communications device, functioning in a TS mode, is equipped to transmit a TIB during a synchronization channel, and determine whether to switch to a non-TS mode based on a deselection utility metric value. In the TS mode, the UE is configured to transmit a TIB, while in the non-TS mode the UE is configured not to transmit the TIB.

26 Claims, 11 Drawing Sheets

(51) Int. Cl.
  *H04W 56/00* (2009.01)
  *H04W 4/02* (2009.01)
  *H04W 4/06* (2009.01)
  *H04W 72/02* (2009.01)
  *H04W 72/04* (2009.01)
  *H04W 88/06* (2009.01)

(52) U.S. Cl.
  CPC ....... *H04W 56/0015* (2013.01); *H04W 72/02* (2013.01); *H04W 72/0446* (2013.01); *H04W 88/06* (2013.01)

(56) References Cited

U.S. PATENT DOCUMENTS

| | | |
|---|---|---|
| 8,010,138 B2 | 8/2011 | Kuru |
| 2010/0272083 A1 | 10/2010 | Itoh et al. |
| 2010/0317358 A1 | 12/2010 | Sawamoto |
| 2012/0011217 A1* | 1/2012 | Weng et al. .................. 709/209 |
| 2012/0033649 A1 | 2/2012 | Hole et al. |
| 2012/0201158 A1 | 8/2012 | Geirhofer et al. |
| 2013/0132500 A1* | 5/2013 | Vandwalle et al. ........... 709/208 |
| 2013/0132502 A1* | 5/2013 | Stacey et al. ................ 709/208 |
| 2013/0185373 A1 | 7/2013 | Vandwalle et al. |
| 2014/0057636 A1* | 2/2014 | Schemagin ......... H04W 84/005 455/441 |
| 2015/0163828 A1* | 6/2015 | Vandwalle .......... H04W 28/044 370/330 |

OTHER PUBLICATIONS

Partial International Search Report—PCT/US2015/011771—ISA/EPO—dated Apr. 24, 2015.

* cited by examiner

METHOD AND APPARATUS FOR TIMING SOURCE SELECTION AND DESELECTION DISTRIBUTED DEVICE TO DEVICE SYNCHRONIZATION

BACKGROUND

Field

The present disclosure relates generally to communication systems, and more particularly, to timing source selection and deselection for distributed device to device (D2D) synchronization.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is LTE. LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (peer-to-peer) communication.

In a D2D communication system where the user equipments (UEs) may not have access to any source of synchronization (e.g., wireless access network (WAN) based, global positing system (GPS) receiver based, etc.), the UEs may achieve synchronization through use of a distributed protocol. In such a protocol, resources for synchronization (e.g., synchronization channel resources) may be allocated on a slow time scale (e.g. once every second) to reduce battery expenditure as well as the amount of resources used for the synchronization. Further, multiple UEs may transmit in multiple broadcast resources available in the synchronization channel, and may receive the transmissions on these resources to obtain timing structure information, frame structure information, time and frequency corrections, other channels' allocations, etc.

In a densely populated D2D communication system, these synchronization channel resources may be heavily reused as all the UEs attempt to transmit in each occurrence of the synchronization channel. If all the devices transmit in the sync channel, there may be problems with scaling of resources, uncontrolled interference to the timing information broadcast (TIB) transmissions, etc.

As such, a system and method to improve synchronization channel design for densely populated D2D communication systems may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with enabling timing source selection and deselection in a decentralized manner for distributed D2D synchronization in densely populated communications systems. In an example, a communications device, functioning in a non-timing source (TS) mode, is equipped to receive a request for timing information during a synchronization channel. The communications device may further be equipped to determine whether to switch to a TS mode based on a selection utility metric value. In another example, a communications device, functioning in a TS mode, is equipped to transmit a TIB during a synchronization channel, and determine whether to switch to a non-TS mode based on a deselection utility metric value. In the TS mode, the UE is configured to transmit a TIB, while in the non-TS mode the UE is configured not to transmit the TIB.

According to related aspects, a method for enabling timing source selection and deselection for distributed D2D synchronization in densely populated communications systems is provided. The method can include receiving, by the UE in a non-TS mode, a request for timing information during a synchronization channel. Moreover, the method may include determining whether to switch to a TS mode based on a selection utility metric value. In an aspect, in the TS mode, the UE is configured to transmit a TIB.

Another aspect relates to a communications apparatus enabled to provide timing source selection and deselection for distributed D2D synchronization in densely populated communications systems. The communications apparatus can include means for receiving, in a non-TS mode, a request for timing information during a synchronization channel. Moreover, the communications apparatus can include means for determining whether to switch to a TS mode based on a selection utility metric value. In an aspect, in the TS mode, the apparatus includes means for transmitting a TIB.

Another aspect relates to a communications apparatus. The apparatus can include a processing system configured to receive, in a non-TS mode, a request for timing information during a synchronization channel. Moreover, the processing system may further be configured to determine whether to switch to a TS mode based on a selection utility metric value. In an aspect, in the TS mode, the processing system is configured to transmit a TIB.

Still another aspect relates to a computer program product of a UE, which can have a computer-readable medium including code for receiving, by the UE in a non-TS mode, a request for timing information during a synchronization channel. Moreover, the computer-readable medium can include code for determining whether to switch to a TS mode based on a selection utility metric value. In an aspect, in the TS mode, the computer-readable medium includes code for transmitting a TIB.

According to related aspects, a method for enabling timing source selection and deselection for distributed D2D synchronization in densely populated communications systems is provided. The method can include transmitting, by the UE in a TS mode, a TIB during a synchronization channel. The method can also include receiving, by the UE in a TS mode, TIB transmissions in resources during a synchronization channel. Moreover, the method may include determining whether to switch to a non-TS mode based on a deselection utility metric value. In an aspect, in the non-TS mode, the UE is configured to not transmit the TIB.

Another aspect relates to a communications apparatus enabled to provide timing source selection and deselection for distributed D2D synchronization in densely populated communications systems. The communications apparatus can include means for transmitting, in a TS mode, a TIB during a synchronization channel. The communications apparatus can also include means for receiving, in a TS mode, TIB transmissions in resources during a synchronization channel. Moreover, the communications apparatus can include means for determining whether to switch to a non-TS mode based on a deselection utility metric value. In an aspect, in the non-TS mode, the apparatus is configured to not transmit the TIB.

Another aspect relates to a communications apparatus. The apparatus can include a processing system configured to transmit, in a TS mode, a TIB during a synchronization channel. The processing system can also be configured to receive, in a TS mode, TIB transmissions in resources during a synchronization channel. Moreover, the processing system may further be configured to determine whether to switch to a non-TS mode based on a deselection utility metric value. In an aspect, in the non-TS mode, the processing system is configured to not transmit the TIB.

Still another aspect relates to a computer program product of a UE, which can have a computer-readable medium including code for transmitting, by the UE in a TS mode, a TIB during a synchronization channel. The computer-readable medium can also include code for receiving, by the UE in a TS mode, TIB transmissions in resources during a synchronization channel. Moreover, the computer-readable medium can include code for determining whether to switch to a non-TS mode based on a deselection utility metric value. In an aspect, in the non-TS mode, the computer-readable medium includes code for not transmitting the TIB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
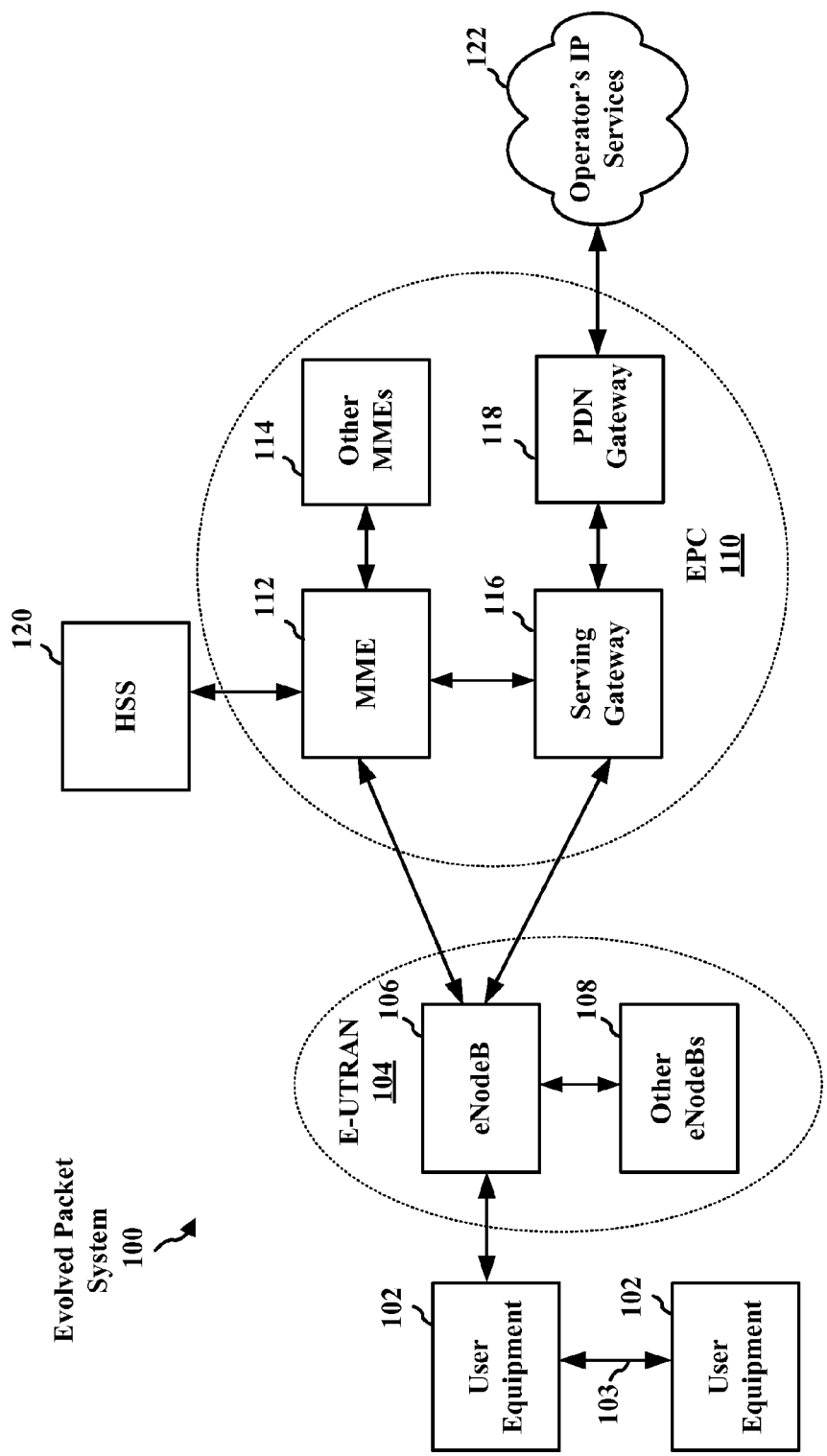
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The UEs 102 may form a D2D connection 103. In an aspect, the D2D connection 103 may be configured to allow the UEs 102 to communicate with each other. In another aspect, a UE 102 may act as a leader of a group of UEs that are able to communicate with each other using the D2D connection 103. Examples of D2D connection 103 are provided with reference to IEEE 802.11p based communications. IEEE 802.11p based dedicated short range communications (DSRC) wave systems provide a basic safety message format where devices (e.g., vehicles) periodically may announce their position, velocity and other attributes to other devices (e.g., other vehicles) allowing the neighboring traffic to track their positions and avoid collisions, improve traffic flow, etc. Further, the communication protocols in these systems do not preclude pedestrians (with their user equipment (UEs)) from utilizing this spectrum and periodically transmitting the basic safety messages which can indicate information such as their presence to vehicles around them.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
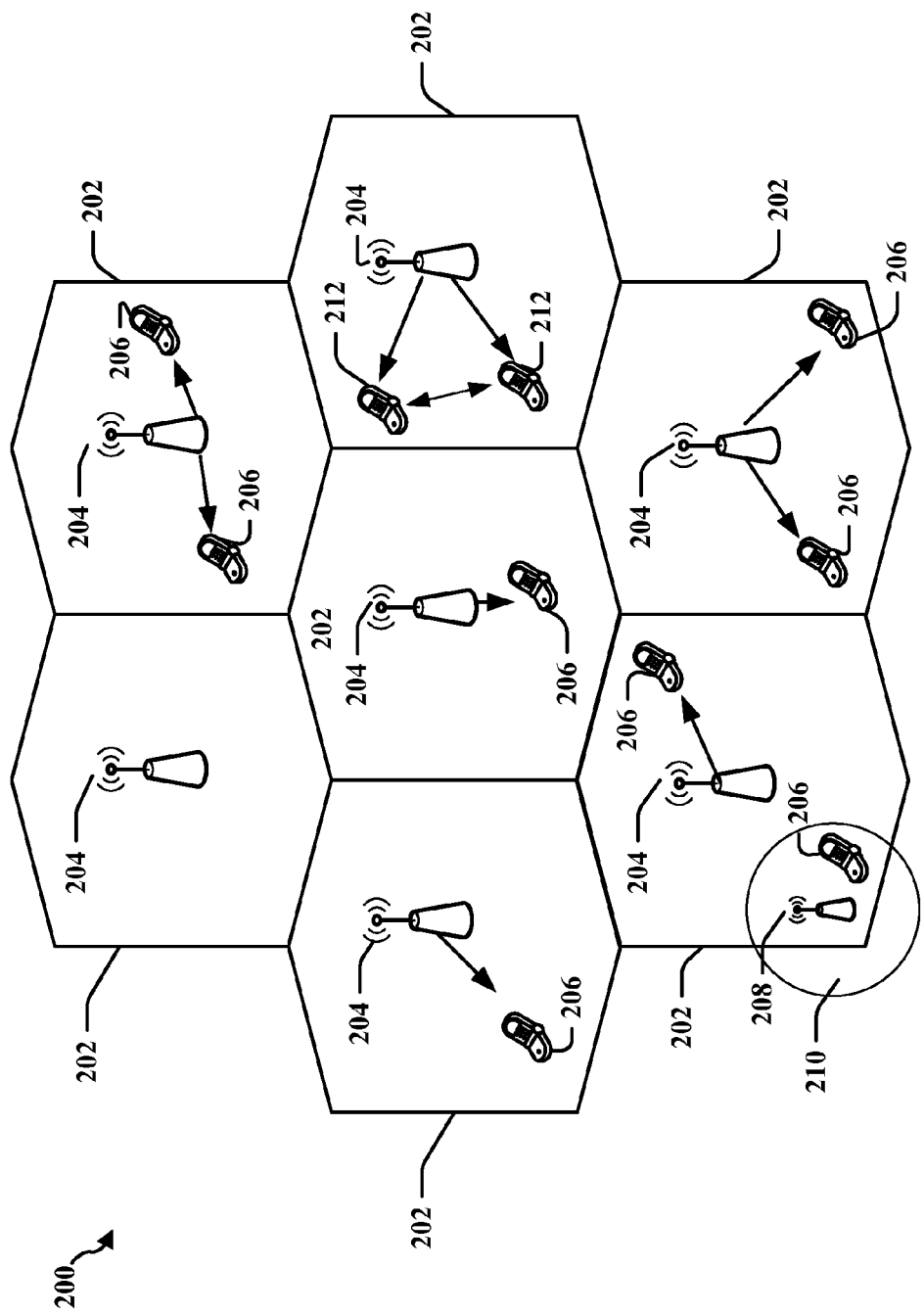
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
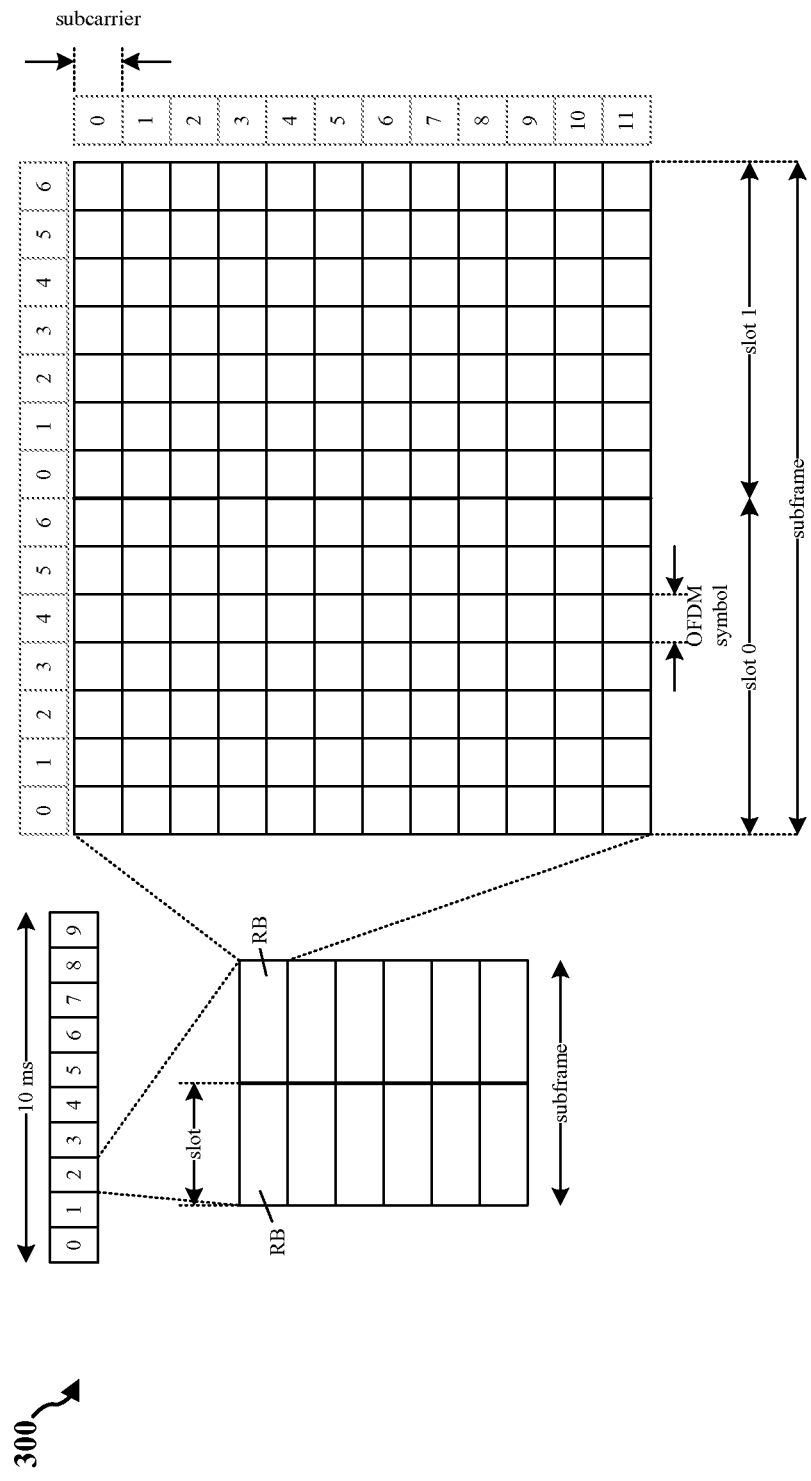
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

Figure 4:
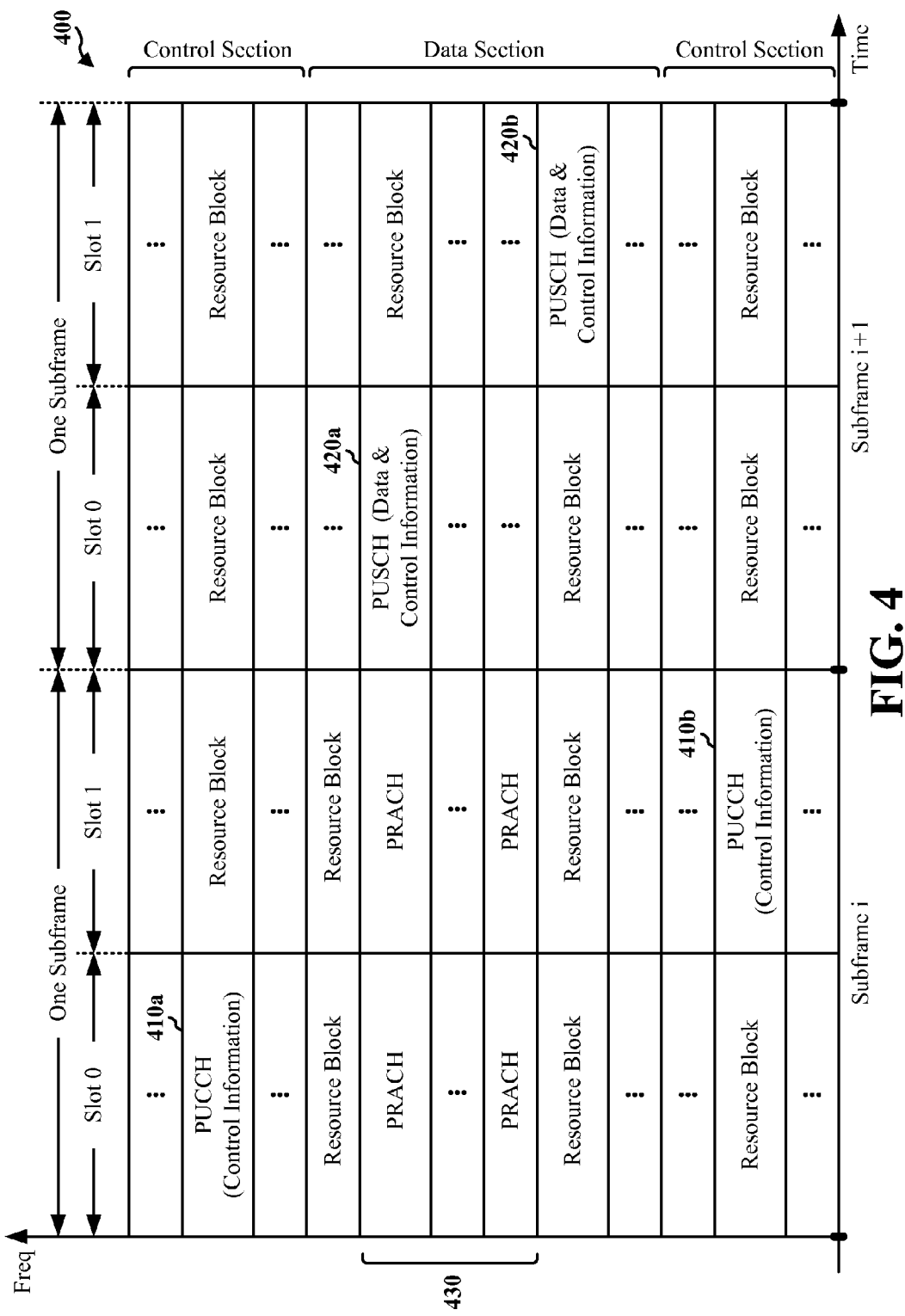
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
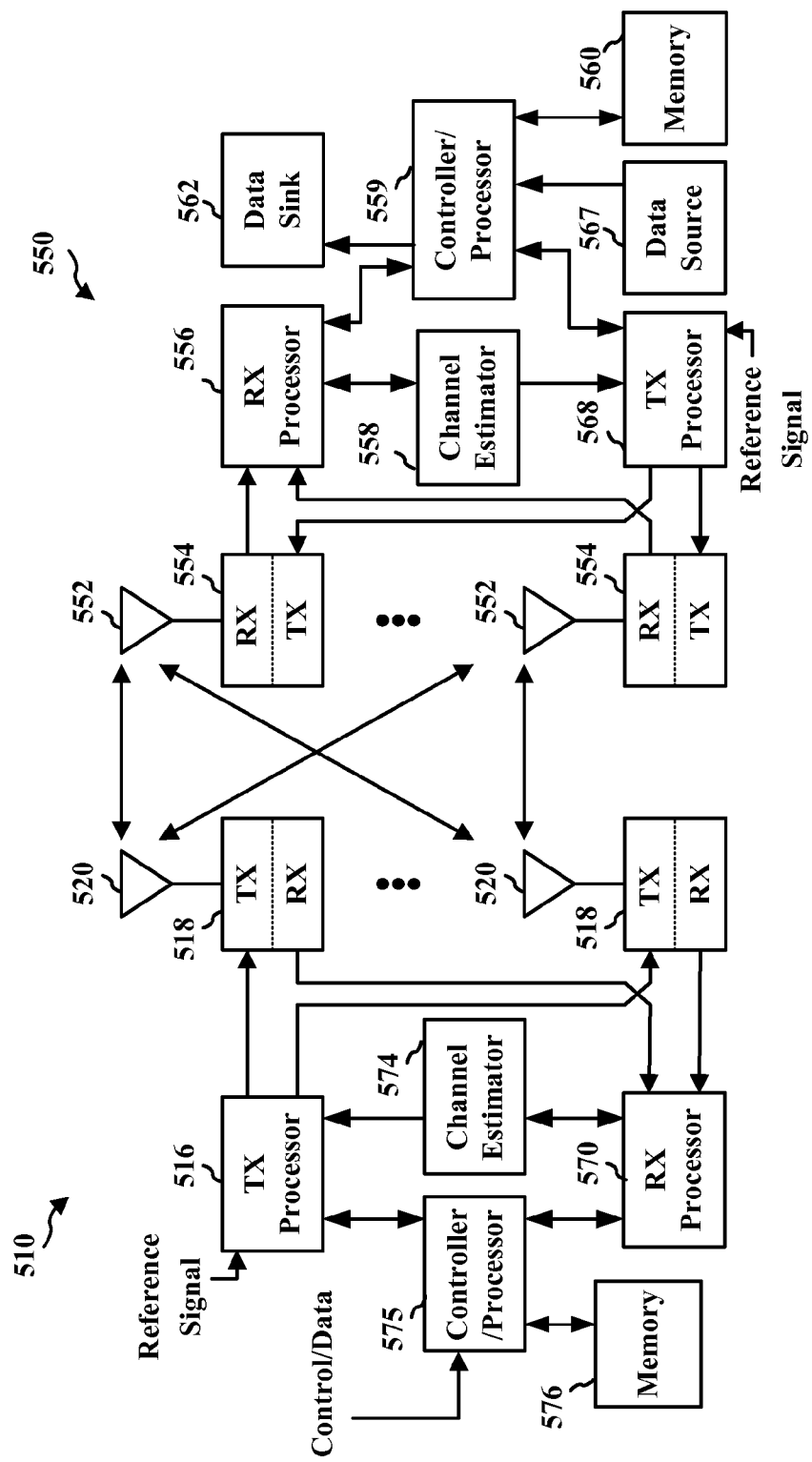
FIG. 5 is a diagram illustrating an example of an evolved Node B and user equipment in an access network.

FIG. 5 is a block diagram of an eNB 510 in communication with a UE 550 in an access network. In the DL, upper layer packets from the core network are provided to a controller/processor 575. The controller/processor 575 implements the functionality of the L2 layer. In the DL, the controller/processor 575 provides header compression, ciphering, packet segmentation and reordering, multiplexing between logical and transport channels, and radio resource allocations to the UE 550 based on various priority metrics. The controller/processor 575 is also responsible for HARQ operations, retransmission of lost packets, and signaling to the UE 550.

The transmit (TX) processor 516 implements various signal processing functions for the L1 layer (i.e., physical layer). The signal processing functions includes coding and interleaving to facilitate forward error correction (FEC) at the UE 550 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 550. Each spatial stream is then provided to a different antenna 520 via a separate transmitter 518TX. Each transmitter 518TX modulates an RF carrier with a respective spatial stream for transmission.

At the UE 550, each receiver 554RX receives a signal through its respective antenna 552. In another aspect, UE 550 may communicate with other UEs similarly to how UE 550 communicates with eNB 510. Each receiver 554RX recovers information modulated onto an RF carrier and provides the information to the receive (RX) processor 556. The RX processor 556 implements various signal processing functions of the L1 layer. The RX processor 556 performs spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 510. These soft decisions may be based on channel estimates computed by the channel estimator 558. The soft decisions are then decoded and deinterleaved to recover the data and control signals that were originally transmitted by the eNB 510 on the physical channel. The data and control signals are then provided to the controller/processor 559.

The controller/processor 559 implements the L2 layer. The controller/processor can be associated with a memory 560 that stores program codes and data. The memory 560 may be referred to as a computer-readable medium. In the UL, the controller/processor 559 provides demultiplexing between transport and logical channels, packet reassembly, deciphering, header decompression, control signal processing to recover upper layer packets from the core network. The upper layer packets are then provided to a data sink 562, which represents all the protocol layers above the L2 layer. Various control signals may also be provided to the data sink 562 for L3 processing. The controller/processor 559 is also responsible for error detection using an acknowledgement (ACK) and/or negative acknowledgement (NACK) protocol to support HARQ operations.

In the UL, a data source 567 is used to provide upper layer packets to the controller/processor 559. The data source 567 represents all protocol layers above the L2 layer. Similar to the functionality described in connection with the DL transmission by the eNB 510, the controller/processor 559 implements the L2 layer for the user plane and the control plane by providing header compression, ciphering, packet segmentation and reordering, and multiplexing between logical and transport channels based on radio resource allocations by the eNB 510. The controller/processor 559 is also responsible for HARQ operations, retransmission of lost packets, and signaling to the eNB 510.

Channel estimates derived by a channel estimator 558 from a reference signal or feedback transmitted by the eNB 510 may be used by the TX processor 568 to select the appropriate coding and modulation schemes, and to facilitate spatial processing. The spatial streams generated by the TX processor 568 are provided to different antenna 552 via separate transmitters 554TX. Each transmitter 554TX modulates an RF carrier with a respective spatial stream for transmission.

The UL transmission is processed at the eNB 510 in a manner similar to that described in connection with the receiver function at the UE 550. Each receiver 518RX receives a signal through its respective antenna 520. Each receiver 518RX recovers information modulated onto an RF carrier and provides the information to a RX processor 570.

The RX processor 570 may implement the L1 layer.

The controller/processor 575 implements the L2 layer. The controller/processor 575 can be associated with a memory 576 that stores program codes and data. The memory 576 may be referred to as a computer-readable medium. In the UL, the controller/processor 575 provides demultiplexing between transport and logical channels, packet reassembly, deciphering, header decompression, control signal processing to recover upper layer packets from the UE 550. Upper layer packets from the controller/processor 575 may be provided to the core network. The controller/processor 575 is also responsible for error detection using an ACK and/or NACK protocol to support HARQ operations.

Figure 6:
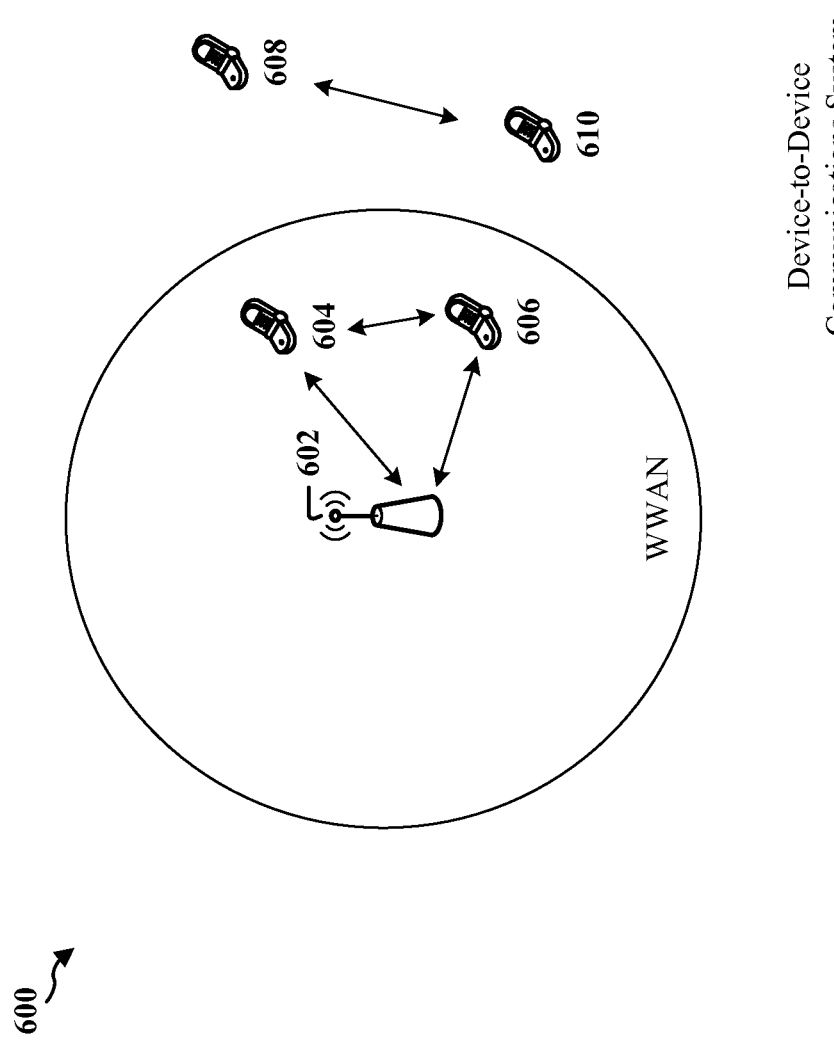
FIG. 6 is a diagram illustrating a device-to-device communications network.

FIG. 6 is a diagram of a device-to-device communications system 600. The device-to-device communications system 600 includes a plurality of wireless devices 604, 606, 608, 610. The device-to-device communications system 600 may overlap with a cellular communications system, such as for example, a wireless wide area network (WWAN). Some of the wireless devices 604, 606, 608, 610 may communicate together in device-to-device communication using the DL/UL WWAN spectrum, some may communicate with the base station 602, and some may do both. For example, as shown in FIG. 6, the wireless devices 608, 610 are in device-to-device communication and the wireless devices 604, 606 are in device-to-device communication. The wireless devices 604, 606 are also communicating with the base station 602.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 7:
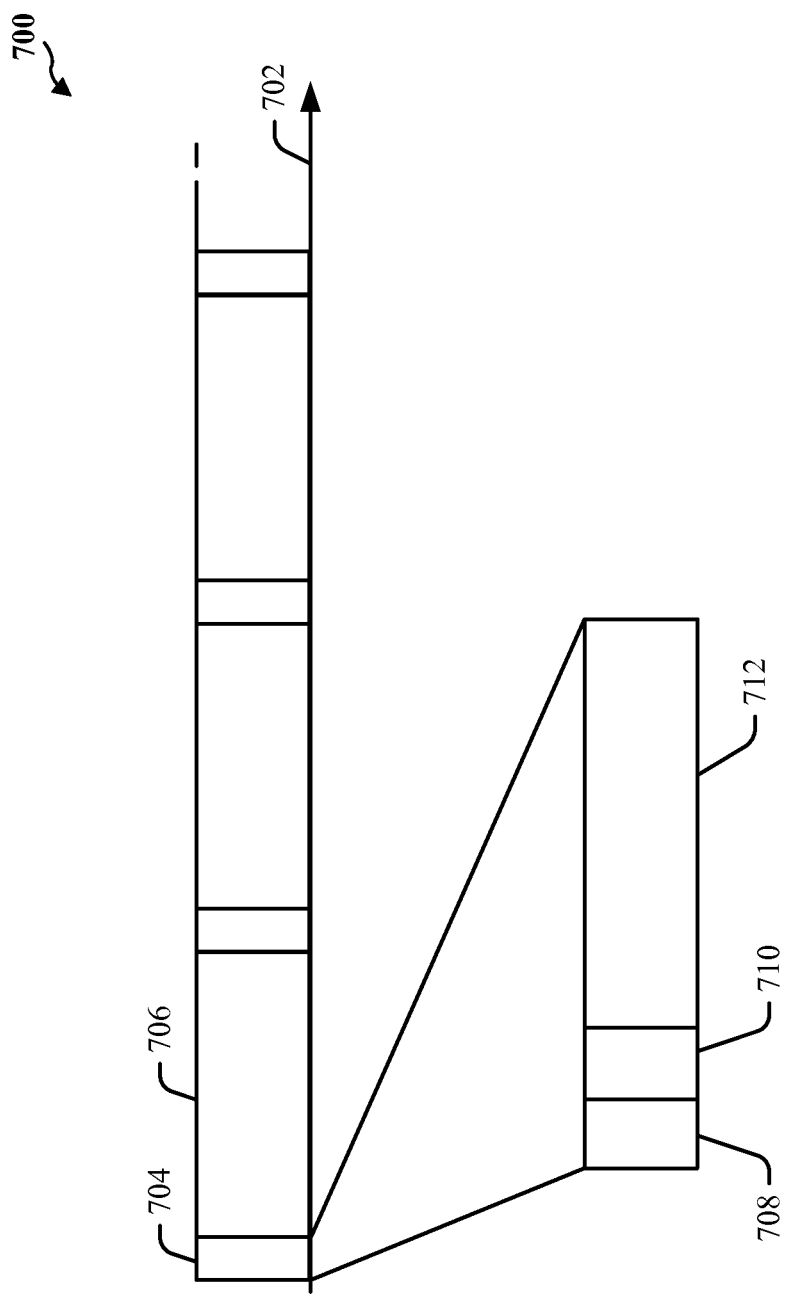
FIG. 7 is block diagram illustrating device-to-device communications network timing structures as time progresses, according to an aspect.

FIG. 7 is block diagram representing a communication structure 700 for a D2D communication system as time 702 progresses. The structure may be used by any UEs in the D2D communication system.

As depicted FIG. 7, the communication structure 700 may include a synchronization period 704 and a communication period 706. As described herein, the synchronization period 704 may also be referred to as a synchronization channel.

In an optional aspect, the synchronization period 704 may be divided into three periods (e.g., sub-channels) including a beacon period 708, a paging period 710, and a timing information block (TIB) broadcast period 712.

In such an optional aspect, during the beacon period 708, all the UEs following the same timing structure may transmit in the resources in the beacon period. As there may be few (e.g., 1-2) resources in the beacon period 708, multiple UEs may transmit on the same resources. In such an aspect, information transmitted during the beacon period 708 may be specific to the timing structure rather than a transmitting UE. In other words, multiple UEs transmitting in a resource in the beacon period 708 may transmit the same synchronization signal.

Further, in such an optional aspect, the paging period 710 may be allocated as a random access sub-channel. As such, transmissions during the paging period 710 may be event driven. In other words, a UE may not transmit on the paging resources in a periodic manner. In an aspect, an event that may trigger a transmission during the paging period 710 may include detection of a beacon transmission without being able to decode any TIB broadcast messages.

Still further, in such an optional aspect, the TIB broadcast period 712 may include multiple resources (e.g., 10-20 resources) that may be designed to be orthogonal to each other. Further, resources in the TIB broadcast period 712 may be reused by UEs that are not in the local vicinity. In an aspect, only a subset of UEs may transmit on one of the resources available in the TIB period 712. In such an aspect, a UE may determine whether to transmit during the TIB period based on information received through a WAN, information received during the paging period 710, etc. In an aspect, the information transmitted on the resources during the TIB period 712 may include but is not limited to: frame structure information used in the timing structure, the age of the timing structure, a resource ID on which the information is being transmitted, other timing related information that UE may decide to transmit (such as the presence of another timing structure in the neighborhood, etc.), etc. In another aspect, the information transmitted during the TIB period may span multiple synchronization period 704 occurrences. In still another aspect, the information transmitted on resources during the TIB period may be specific to the transmitting UE (e.g., a MAC ID of the transmitter, duration the UE intends to continue to transmit on the resource, a preference as to whether the UE prefers to transmit resources during the TIB period, etc.

Figure 8:
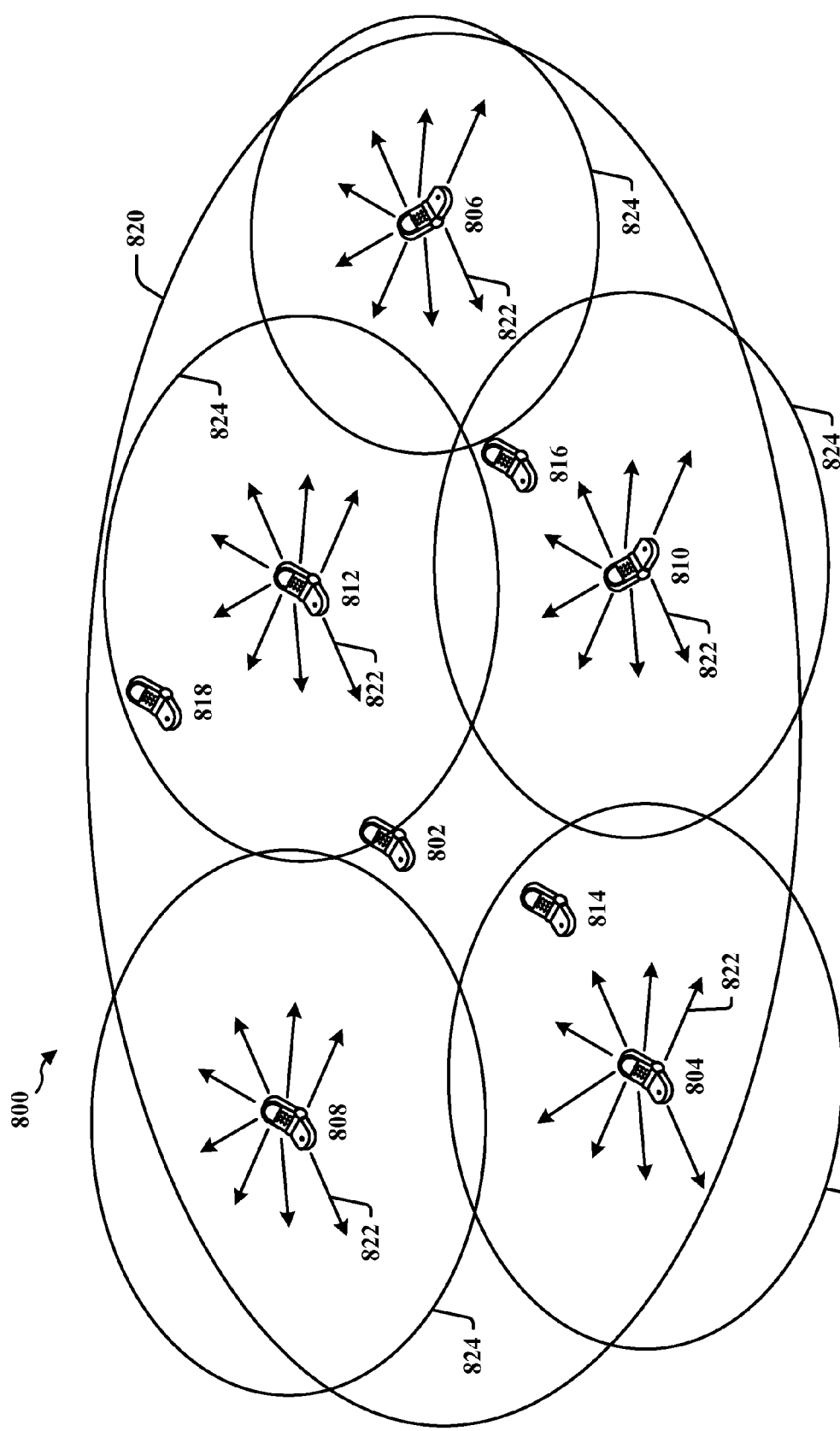
FIG. 8 is a diagram illustrating a device-to-device communications network that is configured to enable timing source selection and deselection for distributed D2D synchronization in densely populated communications systems, according to an aspect.

FIG. 8 is a diagram of a communications system 800 that is configured to support D2D communications.

In an aspect, multiple UEs (e.g., 802-818) may synchronize to a common timing structure within a D2D communication group 820. The UEs 802-818 may synchronize using a distributed D2D synchronization protocol, such as described above with reference to FIG. 7 elements 704 and 706. In another aspect, the UEs 802-818 may synchronize using a distributed D2D synchronization protocol, such as described above with reference to FIG. 7 elements 704-712. In an aspect, a subset of the UEs (e.g., UEs 804-812) in D2D communication group 820 may be configured to operate as timing source UEs (TS UEs), while the remaining UEs (e.g., UEs 802, 814-818) may be configured to operate as non-TS mode UEs. As used herein, a TS UE is a UE that transmits timing information (e.g., TIB content), while a non-TS UE is a UE that does not transmit timing information. In an aspect, a TS UE may transmit timing information 822 to UEs that may be within a measurement area 824 around the UE. For example, the UE 818 may receive timing information 822 from the TS UE 812 as the UE 818 is within the measurement area 824 of the TS UE 812.

In an operational aspect, a UE (e.g., UE 802) may determine whether to switch between a TS mode of operation and a non-TS mode of operation. As discussed in further depth below with reference to the flowchart in FIG. 9, the UE 802 may decide to switch operational modes based on a variety of factors.

Figure 9:
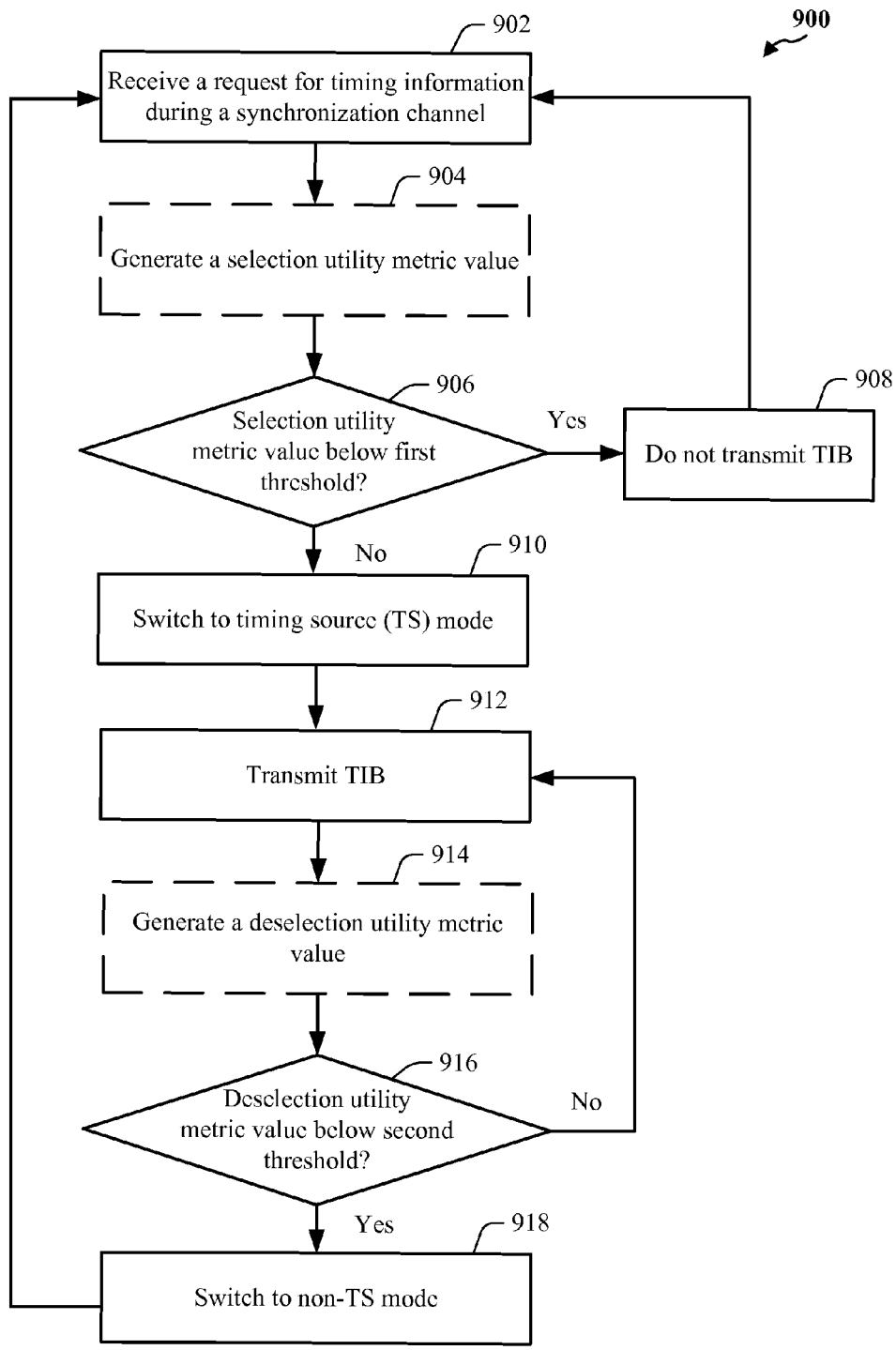
FIG. 9 is a flow chart of a first method of wireless communication.

FIG. 9 illustrates various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could be performed as a series of interrelated states or events, and/or substantially in parallel. Further, the various methodologies described in the blocks below may be performed individually or in any combination.

FIG. 9 is a flowchart of a method 900 of wireless communication. The method may be performed by a UE in a D2D communication system. The method envisions a system where a subset of UEs may transmit the TIB transmissions in the synchronization channel. Such UEs may be referred to as timing source (TS) UEs and/or UEs in a TS mode. For scalability of the synchronization resources, it may be desirable that a number of TS UEs in communication range of another UE be limited and the density of TS UEs does not scale with the density of UEs in the area. In such a system, each non-TS mode UE may be within communication range of a TS UE and each TS UE may be connected to at least one other TS UE (e.g., to allow TS UEs to maintain a common time offset and common clock drift). Further, although discussion in block 902 begins with a process performed by a non-TS mode UE, one of ordinary skill in the art understands that the process may begin anywhere in the process (e.g., block 912, where the UE is in a TS mode).

At block 902, the UE may receive a request for timing information during a synchronization channel duration. For example, apparatus 1002 reception module 1004 may receive a signal 1020 (e.g., a request for timing information) from one or more UEs (e.g., UEs 802, 814-818) in a D2D network 820. In an aspect, the request may be received during a random access sub-channel (e.g., 710) of the synchronization channel.

In an optional aspect, at block 904, the UE may generate a selection utility metric value. For example, apparatus utility metric generation module 1006 may generate a utility metric 1022 (e.g., selection utility metric) based at least in part on information associated with signal(s) 1020 received from the UEs 804-812. In such an aspect, the selection utility metric value may be based on various factors, such as but not limited to, a number of TS UEs within a communication range of the UE, a strongest received power value from among one or more TS UEs, a number of times a request for timing information has been received within a duration of time, an estimated total area covered by the one or more TS UEs within the communication range of the UE, etc. The selection utility metric value may vary as a monotonically non-increasing function of the number of TS UEs that the UE can decode. A UE can estimate the distance from the nearest TS UE based on the received power of the TS UE TIB transmission. Further, the selection utility metric value may vary as a monotonically non-decreasing function of the estimated distance from the nearest TS UE. In other words, the selection utility metric value associated with the UE is a monotonically decreasing function of the power of the strongest TIB transmission received from a TS UE. With respect to a number of recent requests for timing information, a UE may maintain a moving window of the past few (e.g., 2, 5, etc.) synchronization channel instances and maintain a record of the number of timing information requests received. The selection utility metric value may be a monotonically increasing function of the number of requests received in the moving window, the number of consecutive requests received in the immediate past, etc. In an aspect, the RSSI of the received requests may be used to compute the selection utility metric value where the value is an increasing function of the RSSI of the request. In another aspect, a UE may estimate its own decoding range "R" (and hence decoding area) using a path loss model and based on the decoding signal to noise ratio (SNR) used for TIB transmissions. For example, the UE may use equation (1) to estimate path loss. Path loss at distance "d" is given by equation (1) as follows:

$$\text{Path loss (dB)} = K + \text{alpha} * \log(d) \quad (1)$$

In an aspect, "K" may equal 28.6 and "Alpha" may equal 35. Further, the UE may maintain an estimate of a fraction "f" of a decoding area for the UE that may be covered by other TS UE TIB transmissions (M) and update the estimate sequentially. In an aspect, the UE may initialize M to zero (e.g., M=0). Thereafter, the UE may estimate the distance of the transmitter "$d_i$" based on the received power using the assumed path loss model (e.g., equation (1)). Based on $d_i$ and R, the UE may estimate the fraction "$f_i$" of the decoding area covered by the TS UE TIB transmissions. This faction "$f_i$" may be used to update the estimate of the area covered by other TS UE's TIB transmissions "M" using equation (2):

$$M = M + f_i - M * f_i \quad (2)$$

Since a UE may not know the locations of the TS UEs, equation (2) assumes that the location of the $i^{th}$ transmitter is independent of the previous transmitters.

At block 906, the UE determines whether the selection utility metric value is below a first threshold value. For example, apparatus 1002 timing source mode determination module 1010 may receive the utility metric value 1022 (e.g., selection utility metric) from utility metric generation module 1006 to determine whether to switch the functionality of the apparatus 1002 to operate in a TS-mode based on a comparison of the value 1022 and the first threshold value. In an aspect, the first threshold value may be a static defined value and/or may dynamically change based on various UE and D2D system conditions. If at block 906, the UE determines that the selection utility metric value is below the first threshold value, then at block 908, the UE may decide not to transmit a TIB transmission, and may return to block 902.

If at block 906, the UE decides that the selection utility metric value is greater than or equal to the first threshold value, then at block 910, the UE may switch operational modes from a non-TS mode to a TS mode. As noted above, for example, timing source mode determination module 1010 may determine to switch the UE to a TS mode based on the comparison of the value 1022 and the first threshold value. In an aspect, the decision may be probabilistically based on the selection utility metric, rather than deterministically based on the selection utility metric.

At block 912, the UE may transmit the TIB transmission. For example, the timing source mode determination module 1010 may receive timing information 1024 (e.g., content for a TIB) from internal timing information module 1008 and may transmit the timing information 1024 via transmission module 1012 to the UEs 804-818. In an aspect in which the synchronization channel is divided into sub-channels, the UE may transmit the TIB during a TIB sub-channel of the synchronization channel. In such an aspect, the UE may have received the timing information request during a random access sub-channel of the synchronization channel. As noted above, a UE that is initially operating in a TS mode may perform the process 900 starting at block 912.

In an optional aspect, at block 914, the UE may generate a deselection utility metric value. For example, apparatus utility metric generation module 1006 may generate a utility metric 1022 (e.g., deselection utility metric) based at least in part on information associated with signal(s) 1020 received from the UEs 804-818. Similar to the above discussion provided with respect to the generation of the selection utility metric value, the deselection utility metric value may be based on various factors, such as but not limited to, a number of TS UEs within a communication range of the UE, a strongest received power value from among one or more TS UEs, an estimated total area covered by the one or more TS UEs within the communication range of the UE, etc. In an aspect, the selection utility metric and the deselection utility metric may be different values.

At block 916, the UE determines whether the deselection utility metric value is below a second threshold value. For example, apparatus 1002 timing source mode determination module 1010 may receive the utility metric value 1022 (e.g., deselection utility metric) from utility metric generation module 1006 to determine whether to switch the functionality of the apparatus 1002 to operate in a non-TS mode based on a comparison of the value 1022 and the second threshold value. In an aspect, the second threshold value may be a static defined value and/or may dynamically change based on various UE and D2D system conditions. In another aspect, the first and second threshold values may be different values. In an aspect, the decision to switch to a TS mode to transmit TIB information or the decision to switch to a non-TS mode to stop transmitting TIB information is not deterministic, rather the decision may be made probabilistically. In such an aspect, the probability may be a function of the utility metric computed in at 904 and/or 914. If at block 916, the UE decides that the deselection utility metric value is below the second threshold value, then the UE may return to block 912.

If at block 916, the UE determines that the deselection utility metric value is greater than or equal to the second threshold value, then at block 918, the UE may switch operational modes from a TS mode to a non-TS mode and return to block 902. As noted above, for example, timing source mode determination module 1010 may determine to switch the UE to a non-TS mode based on the comparison of the value 1022 and the second threshold value. In an aspect, the decision may be probabilistically based on the selection utility metric, rather than deterministically based on the selection utility metric.

Figure 10:
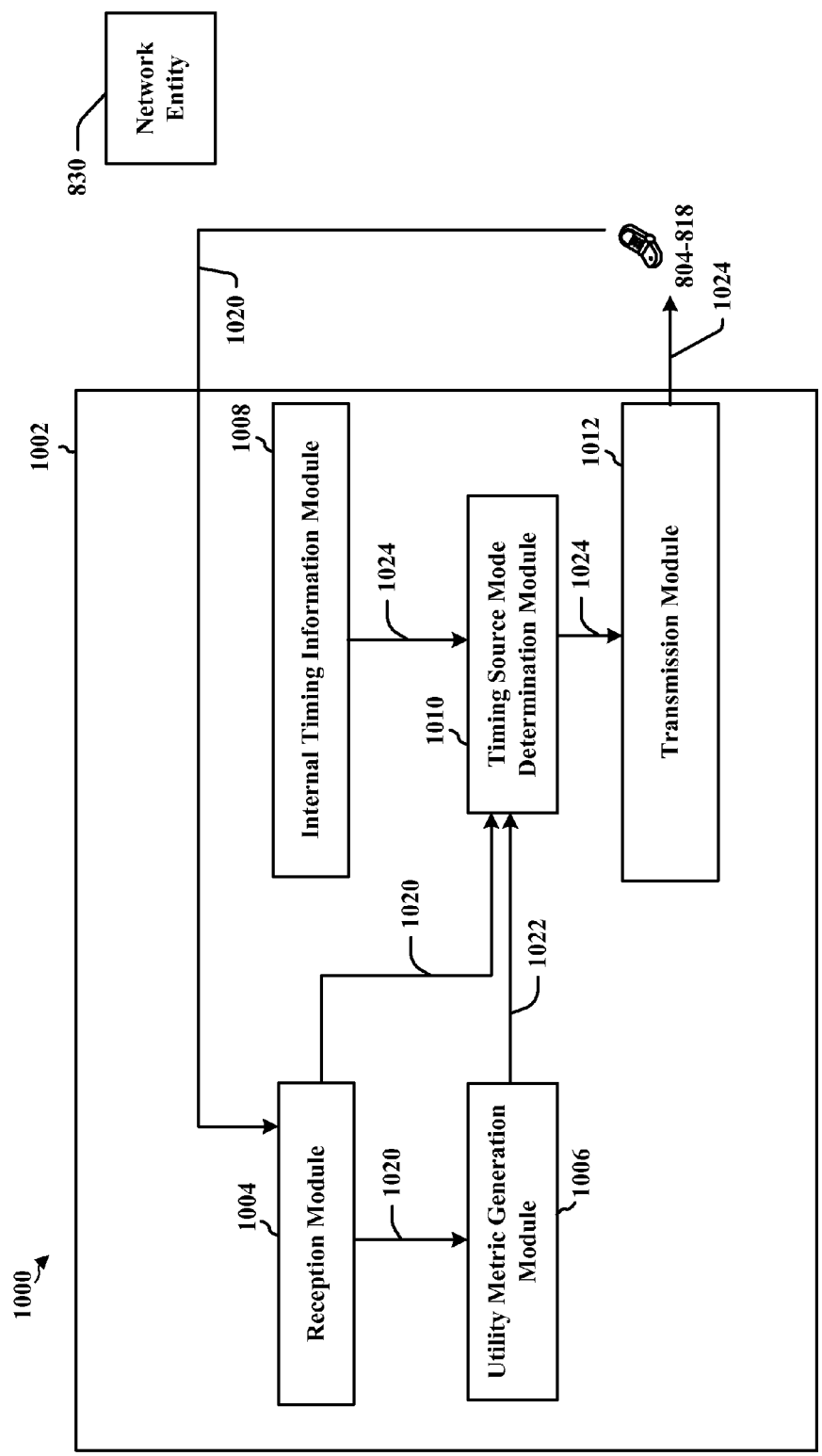
FIG. 10 is a conceptual data flow diagram illustrating the data flow between different modules/means/components in an exemplary apparatus.

FIG. 10 is a conceptual data flow diagram 1000 illustrating the data flow between different modules/means/components in an example apparatus 1002. The apparatus may be a UE (e.g., UE 802). As described with reference to FIG. 10 the apparatus 1002 includes a reception module 1004, utility metric generation module 1006, internal timing information module 1008, timing source mode determination module 1010, and transmission module 1012.

The apparatus may include additional modules that perform each of the steps of the algorithm in the aforementioned flow chart of FIG. 9. As such, each block in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
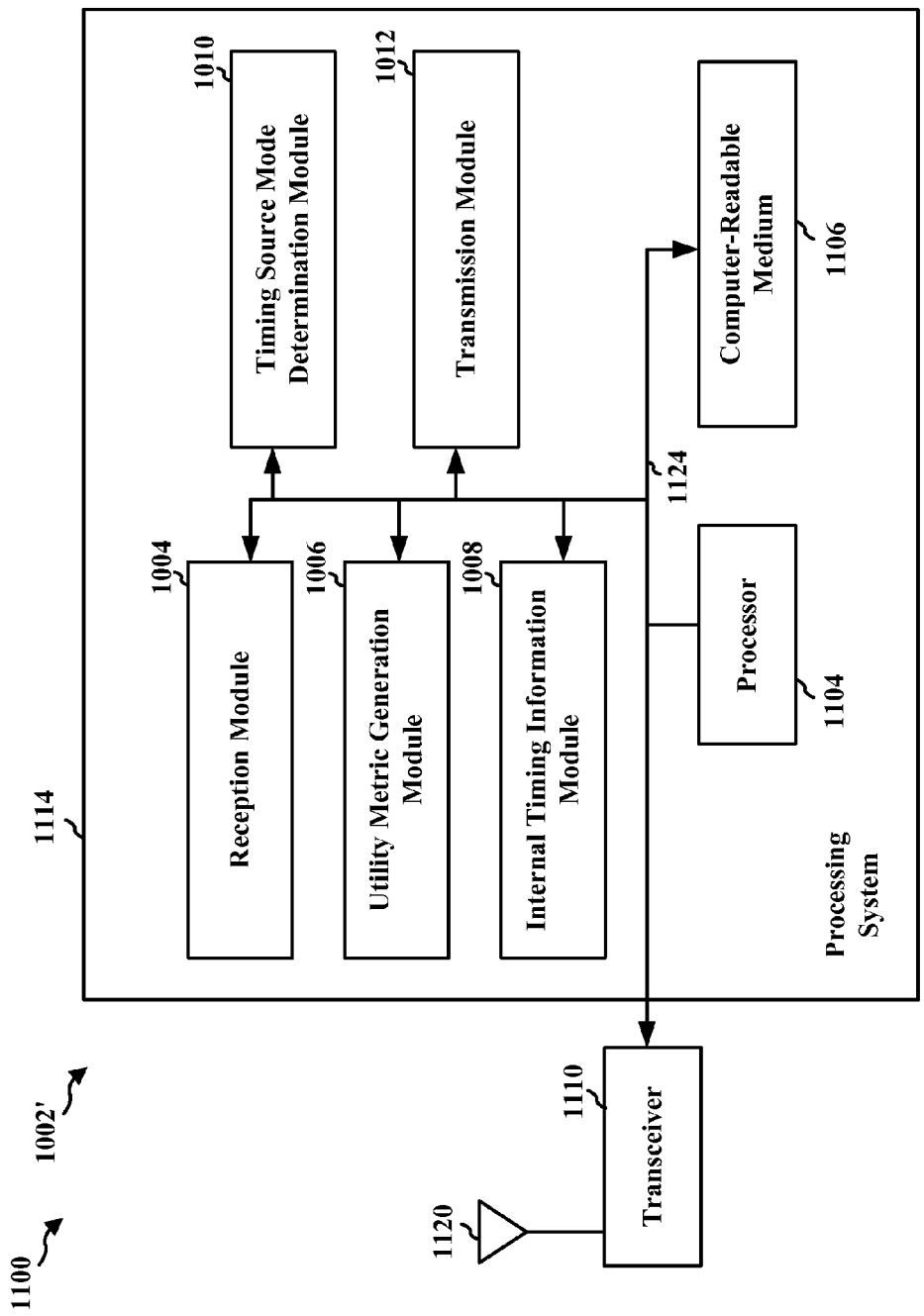
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, 1010, and 1012. The modules may be software modules running in the processor 1104, resident/stored in the computer-readable medium 1106, one or more hardware modules coupled to the processor 1104, or some combination thereof. The processing system 1114 may be a component of the UE 550 and may include the memory 560 and/or at least one of the TX processor 568, the RX processor 556, and the controller/processor 559.

In one configuration, the apparatus 1002/1002' for wireless communication, in a D2D network with distributed synchronization, includes means for receiving, by a UE in a non-TS mode, a request for timing information during a synchronization channel, and means for determining whether to switch to a TS mode based on a selection utility metric value. In an aspect, the UE is configured to transmit a TIB when in the TS mode. In an aspect, the apparatus 1002/1002' may further include means for switching to the TS mode when the selection utility metric value is greater than or equal to a first utility metric threshold, and the means for transmitting the TIB during the synchronization channel. In an aspect, the apparatus 1002/1002' may further include means for generating the selection utility metric value. In an aspect, the apparatus 1002/1002' means for generating may be further configured to determine the communication range of the UE based on a SNR threshold for decoding a received TIB transmission, determine a fraction of the area within the communication range of the UE covered by the one or more UEs in the TS mode based on received power values from each of the one or more UEs, and estimate the total area covered by the one or more UEs in the TS mode based on the fraction of the area within the communication range of the UE covered by the one or more UEs in the TS mode.

In another configuration, the apparatus 1002/1002' for wireless communication, in a D2D network with distributed synchronization, includes means for transmitting, by a UE in a TS mode, a TIB during a synchronization channel, and means for determining whether to switch to a non-TS mode based on a deselection utility metric value. In an aspect, the UE is configured not to transmit a TIB when in the non-TS mode. In an aspect, the apparatus 1002/1002' may further include means for generating the deselection utility metric value. In an aspect, the apparatus 1002/1002' means for generating may be further configured to determine the communication range of the UE based on a SNR threshold for decoding a received TIB transmission, determine a fraction of area within the communication range of the UE covered by the one or more UEs in the TS mode based on received power values from each of the one or more UEs, and estimate the total area within the communication range covered by the one or more UEs in the TS mode based on the fraction of area within the communication range of the UE covered by the one or more UEs in the TS mode.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 568, the RX Processor 556, and the controller/processor 559. As such, in one configuration, the aforementioned means may be the TX Processor 568, the RX Processor 556, and the controller/processor 559 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications for a user equipment (UE) in a device-to-device (D2D) network with distributed synchronization, comprising:
    receiving, by the UE in a non-timing source (TS) mode, a request for timing information during a synchronization channel;
    estimating a total area within a communication range covered by one or more UEs in the TS mode;
    generating a selection utility metric value based on the estimated total area within the communication range covered by the one or more UEs in the TS mode within the communication range of the UE;
    determining whether to switch to a TS mode based on the selection utility metric value, wherein in the TS mode the UE is configured to transmit a timing information broadcast (TIB); and;
    transmitting the TIB during the synchronization channel when the UE switches to the TS mode.

2. The method of claim 1, wherein the UE determines not to switch to the TS mode when the selection utility metric value is below a first utility metric threshold.

3. The method of claim 1, further comprising:
    switching to the TS mode when the selection utility metric value is greater than or equal to a first utility metric threshold.

4. The method of claim 1, further comprising:
    switching to the TS mode with a probability based on the selection utility metric value.

5. The method of claim 3, wherein the request for the timing information is received using a random access sub-channel duration of the synchronization channel, and wherein the TIB is transmitted during a TIB sub-channel duration of the synchronization channel.

6. The method of claim 1, wherein the selection utility metric value is further generated based on at least one of:
    a number of UEs in the TS mode within the communication range of the UE;
    a strongest received power value from among the one or more UEs in the TS mode;
    a number of times a request for timing information has been received within a duration of time; or
    the received request for timing information.

7. The method of claim 6, wherein the duration of time comprises a moving window covering one or more of a most recent number of instances of a synchronization channel.

8. The method of claim 1, further comprising:
    determining a distance of the UE based on a signal to noise ratio (SNR) threshold for decoding a received TIB transmission; and
    determining a fraction of an area within the communication range of the UE covered by the one or more UEs in the TS mode based on received power values from each of the one or more UEs, wherein
    the estimation of the total area within the communication range covered by the one or more UEs in the TS mode is based on the fraction of the area within the communication range of the UE covered by the one or more UEs in the TS mode.

9. A method of wireless communications for a user equipment (UE) in a device-to-device (D2D) network with distributed synchronization, comprising:
    transmitting, by the UE in a timing source (TS) mode, a timing information broadcast (TIB) during a synchronization channel;
    receiving, by the UE in the TS mode, TIB transmissions during the synchronization channel;
    estimating a total area within a communication range covered by one or more UEs in the TS mode;
    generating a deselection utility metric value based on the estimated total area within the communication range covered by the one or more UEs in the TS mode within the communication range of the UE;
    determining whether to switch to a non-TS mode based on the deselection utility metric value, wherein in the non-TS mode the UE is configured to not transmit the TIB; and
    refraining from transmitting the TIB during the synchronization channel when the UE switches to the non-TS mode.

10. The method of claim 9, wherein the UE determines to switch to the non-TS mode when the deselection utility metric value is below a second utility metric threshold.

11. The method of claim 9, wherein the UE determines to switch to the non-TS mode with a probability based on the deselection utility metric value.

12. The method of claim 9, wherein the deselection utility metric value is generated further based on at least one of:
    a number of UEs in the TS mode within the communication range of the UE;

a strongest received power value from among the one or more UEs in the TS mode; or the received TIB transmissions.

13. The method of claim 9, further comprising:
determining a distance of the UE based on a signal to noise ratio (SNR) threshold for decoding a received TIB transmission; and
determining a fraction of the area within the communication range of the UE covered by the one or more UEs in the TS mode based on received power values from each of the one or more UEs, wherein
the estimation of the total area within the communication range covered by the one or more UEs in the TS mode is based on the fraction of the area within the communication range of the UE covered by the one or more UEs in the TS mode.

14. The method of claim 9, wherein the TIB is transmitted during a TIB sub-channel duration of the synchronization channel.

15. An apparatus for communication in a device-to-device (D2D) network with distributed synchronization, comprising:
a memory; and
at least one processor coupled to the memory and configured to:
receive, in a non-timing source (TS) mode, a request for timing information during a synchronization channel;
estimate a total area within a communication range covered by one or more UEs in the TS mode;
generate a selection utility metric value based on the estimated total area within the communication range covered by the one or more UEs in the TS mode within the communication range of the apparatus;
determine whether to switch to a TS mode based on the selection utility metric value, wherein in the TS mode the processing system is configured to transmit a timing information broadcast (TIB);
transmit the TIB during the synchronization channel when the apparatus switches to the TS mode.

16. The apparatus of claim 15, wherein the at least one processor is configured to determine not to switch to the TS mode when the selection utility metric value is below a first utility metric threshold.

17. The apparatus of claim 15, wherein the at least one processor is further configured to:
at least one of switch to the TS mode when the selection utility metric value is greater than or equal to a first utility metric threshold or switch to the TS mode with a probability based on the selection utility metric value.

18. The apparatus of claim 17, wherein the request for the timing information is received using a random access sub-channel duration of the synchronization channel, and wherein the TIB is transmitted during a TIB sub-channel duration of the synchronization channel.

19. The apparatus of claim 15, wherein the selection utility metric value is generated further based on at least one of:
a number of UEs in the TS mode within the communication range of the apparatus;
a strongest received power value from among the one or more UEs in the TS mode;
a number of times a request for timing information has been received within a duration of time; or
the received request for timing information.

20. The apparatus of claim 19, wherein the duration of time comprises a moving window covering one or more of a most recent number of instances of a synchronization channel.

21. The apparatus of claim 15, wherein the at least one processor is further configured to:
determine a distance of the apparatus based on a signal to noise ratio (SNR) threshold for decoding a received TIB transmission; and
determine a fraction of an area within the communication range of the apparatus covered by the one or more UEs in the TS mode based on received power values from each of the one or more UEs, wherein
the estimation of the total area within the communication range covered by the one or more UEs in the TS mode is based on the fraction of the area within the communication range of the apparatus covered by the one or more UEs in the TS mode.

22. An apparatus for communication in a device-to-device (D2D) network with distributed synchronization, comprising:
a memory; and
at least one processor coupled to the memory and configured to:
transmit, in a timing source (TS) mode, a timing information broadcast (TIB) during a synchronization channel;
receive, in the TS mode, TIB transmissions during the synchronization channel;
estimate a total area within a communication range covered by one or more UEs in the TS mode;
generate a deselection utility metric value based on the estimated total area within the communication range covered by the one or more UEs in the TS mode within the communication range of the apparatus;
determine whether to switch to a non-TS mode based on the deselection utility metric value, wherein in the non-TS mode the processing system is configured to not transmit the TIB; and
refrain from transmission of the TIB during the synchronization channel when the apparatus switches to the non-TS mode.

23. The apparatus of claim 22, wherein the at least one processor is configured to determine to switch to the non-TS mode when the deselection utility metric value is below a second utility metric threshold or determine to switch to the non-TS mode with a probability based on the deselection utility metric value.

24. The apparatus of claim 22, wherein the deselection utility metric value is generated further based on at least one of:
a number of UEs in the TS mode within the communication range of the apparatus;
a strongest received power value from among the one or more UEs in the TS mode; or the received TIB transmissions.

25. The apparatus of claim 22, wherein the at least one processor is further configured to:
determine a distance of the apparatus based on a signal to noise ratio (SNR) threshold for decoding a received TIB transmission; and
determine a fraction of an area within the communication range of the apparatus covered by the one or more UEs in the TS mode based on received power values from each of the one or more UEs, wherein
the estimation of the total area within the communication range covered by the one or more UEs in the TS mode is based on the fraction of the area within the communication range of the apparatus covered by the one or more UEs in the TS mode.

26. The apparatus of claim 20, wherein the TIB is transmitted during a TIB sub-channel duration of the synchronization channel.

* * * * *